(12) United States Patent
Takayanagi

(10) Patent No.: US 6,505,225 B1
(45) Date of Patent: Jan. 7, 2003

(54) ADDER LOGIC CIRCUIT AND PROCESSOR

(75) Inventor: Toshinari Takayanagi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/500,644

(22) Filed: Feb. 9, 2000

(30) Foreign Application Priority Data

Feb. 1, 2000 (JP) ........................................ 2000-023998

(51) Int. Cl.$^7$ ................................................ G06F 7/50
(52) U.S. Cl. ........................................ 708/670; 712/221
(58) Field of Search .............................. 708/670, 700; 712/220–221

(56) References Cited

U.S. PATENT DOCUMENTS

| | | | | |
|---|---|---|---|---|
| 4,719,589 A | * | 1/1988 | Tanaka ......................... | 708/530 |
| 5,504,698 A | * | 4/1996 | Su ............................... | 708/670 |
| 5,612,911 A | * | 3/1997 | Timko ......................... | 708/670 |
| 5,640,578 A | * | 6/1997 | Balmer ........................ | 708/670 |
| 5,961,580 A | * | 10/1999 | Mahalingaiah .............. | 708/670 |
| 6,330,581 B1 | * | 12/2001 | Hale ........................... | 708/670 |
| 6,334,136 B1 | * | 12/2001 | Blomgren et al. .......... | 708/670 |

* cited by examiner

*Primary Examiner*—Tan V. Mai
(74) *Attorney, Agent, or Firm*—Finnegan, Henderson, Farabow, Garrett & Dunner, L.L.P.

(57) ABSTRACT

An adder logic circuit for performing an addition operation of a first numerical value and a second numerical value having a bit width narrower than that of the first numerical value is described. The adder logic circuit is composed of an adder element for performing an addition operation of the second numerical value and a third numerical value composed of a lower bit sequence of the first numerical value, the bit width of the third numerical value being equal to the bit width of the second numerical value; and a higher bit handling logic circuit connected to the adder element for receiving a carry out from the most significant bit of the adder element together with a fourth numerical value composed of a higher bit sequence composed of the remainder of the first numerical value, the most significant bit of the second numerical value in order to output one of the fourth numerical value, the fourth numerical value as incremented and the fourth numerical value as decremented in accordance with the carry out from the most significant bit of the adder element and the most significant bit of the second numerical value.

9 Claims, 3 Drawing Sheets

ADDER LOGIC CIRCUIT AND PROCESSOR

BACKGROUND OF THE INVENTION

1. Field of the Invention

The present invention is related to an adder logic circuit for performing an addition operation of numerical values having different bit widths. More specifically speaking, the present invention is related to an improved processor capable of quickly generating addresses necessary to access a memory.

2. Prior Art

Recently, there increasingly arises a great demand for high speed operation of a processor. which is a core element of computer systems, along with an increasing amount of data to be processed such as multimedia application.

A computer system can generally be divided into three basic blocks: a central processing unit (CPU), memory, and an input/output interface (I/O). These blocks are interconnected by one or more buses. Typically. an input device, such as a keyboard, mouse, disk drive, etc., is used to input data and/or computer programs to the computer system through the computer's I/O device.

The computer programs instruct the computer system as to how the data should be processed. These instructions and data are usually stored in memory. The CPU retrieves the data stored in the memory and processes the data according to the instructions. The results can be stored back into memory or outputted via the I/O interface to a printer, video monitor, speaker, etc.

When a computer program changes a value stored in memory, it is performing a "store" operation. And when the computer is retrieving an instruction or data from memory it is performing a "load" operation. Each of these load and store operations require an address that specifies a location in memory. In a store operation, the address specifies a location in memory that is available for storing the data. In a load operation, the address specifies the location in memory where the desired instruction or data resides.

Typically, in a modern computer system, there are several different varieties of addressing reflecting different levels of abstraction. For example, there are the logical, linear and physical addresses. The logical address is specified in the assembly language or machine code program, and consists of a selector and an offset. The offset is formed by adding together 3 components: base, scaled index and displacement. The logical address space is, therefore, segmented.

The logical address (consisted of segment, offset) is transformed to a flat linear address by adding a segment base corresponding to the segment selector to obtain a linear address.

As mentioned above, a logical address consists of segment: offset pair, and the offset is often itself calculated via a formula as follows.

1) base-register+index-register*scale
2) base-register+immediate.

Correspondingly, this implies that the linear address is 1) segment-base+base-register+index-register*scale
2) segment-base+base-register+immediate.

These formulae and the encodings used to represent them in the instruction stream are called "addressing modes."

Generally speaking, there are a variety of combinations of the two operands as used the addressing modes. For example, the bit width of the first operand may be equal to, or larger or smaller than the bit width of the second operand in each addition operation. Also, the second operand may be either signed or unsigned.

Memory can be divided into one or more variable length segments, which can be swapped to disk or shared between programs. Memory can also be organized into one or more "pages". Segmentation and paging are complementary. Segmentation is useful to application programmers for organizing memory in logical modules, whereas pages are useful to the system programmer for managing the physical memory of a system.

Typically, a segmentation unit is used to translate the logical address space into a 32-bit linear address space. A paging unit is then used to translate this linear address space into a physical address space. It is this physical address that appears on a microprocessor chip's address pins.

In the case of accessing an entry within a page, the address of the page is calculated followed by obtaining the physical address by adding the page offset to the address of the page. Also in this case, the bit width of the first operand may be equal to, or larger or smaller than the bit width of the second operand in each addition operation while the second operand may be either signed or unsigned.

In accordance with the prior art, the addition operation of a first numerical value and a second numerical value having a bit width narrower than that of the first numerical value is performed by an adder having the bit width equal to that of the first numerical value after sign-extension or zero-extension of the second numerical value.

For example, as illustrated in FIG. 1, when A[m−1:0] and B[n−1:01 ] (m>n) are added, B[n−1:01] is transferred to lower n bits of a latch circuit 101 which has a bit width of m bits followed by transferring the most significant bit B[n−1] to all the remaining higher bits of the latch circuit 101. On the other hand, A[m−1:0] is transferred to a latch circuit 103 which has a bit width of m bits. These two m-bits values are added by means of the m-bit adder 105 in a usual way.

However, as explained above, the addition operation is frequently performed when accessing to a memory. For example, while call or jump procedures relative to next instruction appears in most loops, the extension process is also repeated in the loops resulting in significant influence upon the performance of the system.

SUMMARY OF THE INVENTION

The present invention has been made in order to solve the shortcomings as described above. It is an important object of the present invention to provide an adder logic circuit capable of performing an addition operation of a first numerical value and a second numerical value having a bit width narrower than that of the first numerical value at a high speed.

It is another object of the present invention to provide an improved processor capable of quickly generating addresses necessary to access a memory.

In brief, the above and other objects and advantages of the present invention are provided by a new and improved adder logic circuit for performing an addition operation of a first numerical value and a second numerical value having a bit width narrower than that of said first numerical value comprising:

an adder element for performing an addition operation of said second numerical value and a third numerical value composed of a lower bit sequence of said first numerical value, the bit width of said third numerical value being equal to the bit width of said second numerical value; and a higher bit handling logic circuit connected to said adder element for receiving a carry out from the most significant bit of said adder element together with a fourth numerical value composed of a higher bit sequence composed of the remainder of said first numerical value, the most significant bit of said the second numerical value in order to output one of said fourth numerical value, said fourth numerical value as incremented and said fourth numerical value as decremented in accordance with the carry out from the most significant bit of said adder element and the most significant bit of said second numerical value.

Also, in accordance with a preferred embodiment of the present invention. said higher bit handling logic circuit is composed of an incrementer for incrementing said fourth numerical value, a decrementer for decrementing said fourth numerical value and a selector logic circuit for outputting one of the output of said incrementer, the output of said decrementer and said the fourth numerical value in accordance with the most significant bit of said second numerical value.

Furthermore, in accordance with a preferred embodiment of the present invention, said selector logic circuit Is composed of a first selector element for selecting and outputting one of first and second pairs of bit sequences in accordance with the most significant bit of said second numerical value, the first pair comprising the output of said incrementer and said fourth numerical value, the second pair comprising the output of said decrementer and said fourth numerical value, and a second selector logic circuit for selecting and outputting one of the pair as selected by said first selector element in accordance with the carry out from the most significant bit of said adder element.

In accordance with another aspect of the present invention, a processor including:
an address bus connected to a memory;
a data bus connected to said memory; and an address generating unit for calculating an address of an instruction/data required for execution of a program;
said address generating unit provided with an adder logic circuit for performing an addition operation of a first numerical value and a second numerical value having a bit width narrower than that of said first numerical value, said adder logic circuit comprising;
    an adder element for performing an addition operation of said second numerical value and a third numerical value composed of a lower bit sequence of said first numerical value, the bit width of said third numerical value being equal to the bit width of said second numerical value; and
    a higher bit handling logic circuit connected to said adder element for receiving a carry out from the most significant bit of said adder element together with a fourth numerical value composed of a higher bit sequence composed of the remainder of said first numerical value, the most significant bit of said the second numerical value in order to output one of said fourth numerical value, said fourth numerical value as incremented and said fourth numerical value as decremented in accordance with the carry out from the most significant bit of said adder element and the most significant bit of said second numerical value.

In accordance with a further aspect of the present invention, a processor including:
an address bus connected to a memory;
a data bus connected to said memory; and
an address generating unit for calculating an address of an instruction/data required for execution of a program;
said address generating unit provided with a first adder logic circuit for performing an addition operation of two numerical values having the same bit width and a second adder logic circuit for performing an addition operation of a first numerical value and a second numerical value having a bit width narrower than that of said first numerical value, said adder logic circuit comprising:
    an adder element for performing an addition operation of said second numerical value and a third numerical value composed of a lower bit sequence of said first numerical value, the bit width of said third numerical value being equal to the bit width of said second numerical value; and
    a higher bit handling logic circuit connected to said adder element for receiving a carry out from the most significant bit of said adder element together with a fourth numerical value composed of a higher bit sequence composed of the remainder of said first numerical value, the most significant bit of said the second numerical value in order to output one of said fourth numerical value, said fourth numerical value as incremented and said fourth numerical value as decremented in accordance with the carry out from the most significant bit of said adder element and the most significant bit of said second numerical value.

BRIEF DESCRIPTION OF DRAWINGS

The aforementioned and other features and objects of the present invention and the manner of attaining them will become more apparent and the invention itself will be best understood by reference to the following description of a preferred embodiment taken In conjunction with the accompanying drawings wherein.

DETAILED DESCRIPTION OF EMBODIMENTS

Hereinbelow, several preferred embodiments in accordance with the present invention will be explained in conjunction with the accompanied drawings. The embodiments of the present invention pertains to an address generation unit of a microprocessor in a computer system.

Figure 1:
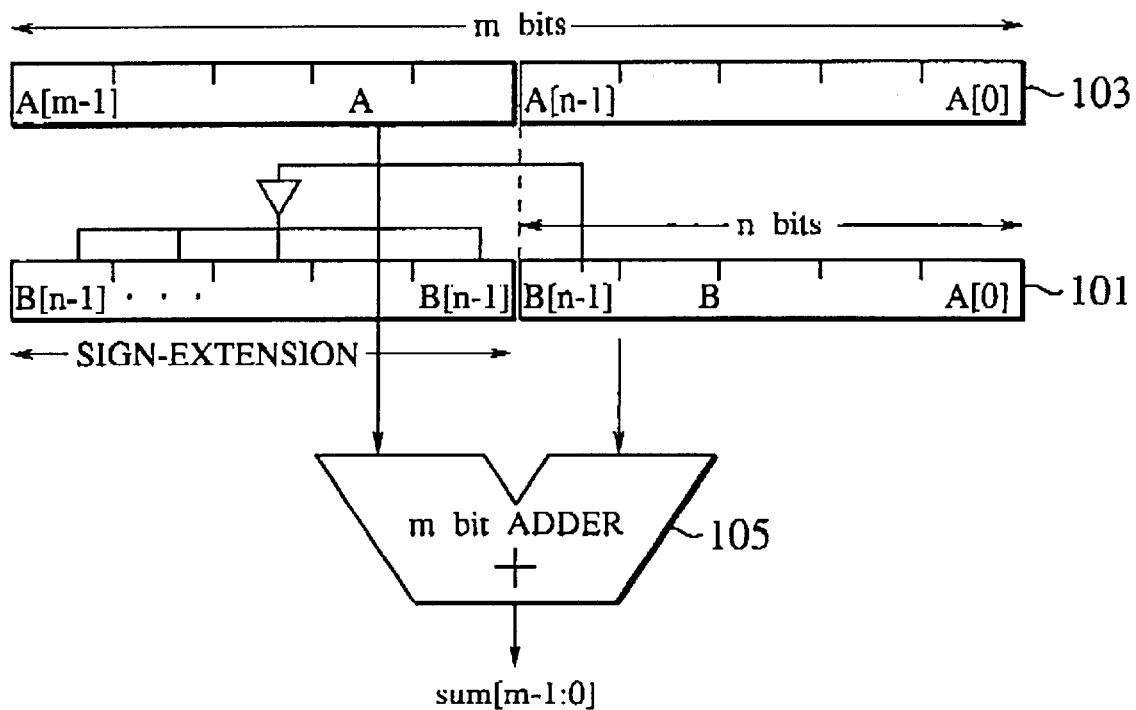
FIG. 1 is a block diagram showing an adder logic circuit in accordance with a prior art.
Figure 2:
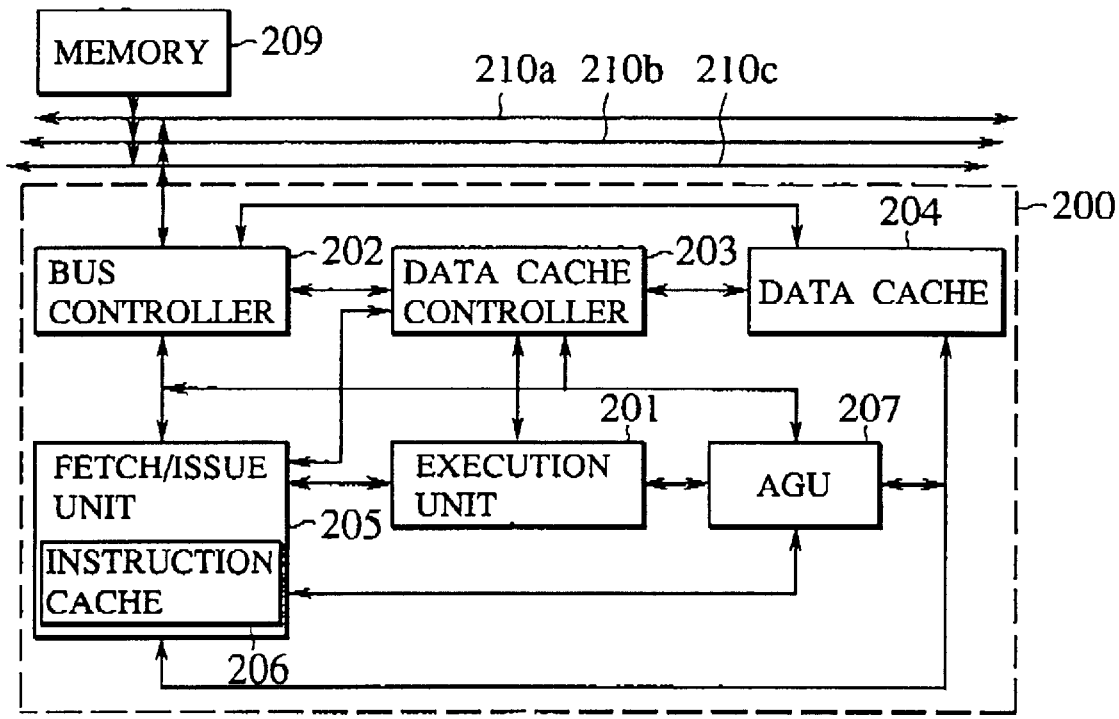
FIG. 2 is a schematic diagram illustrating a processor equipped with a adder logic circuit in accordance with an embodiment of the present invention is shown.

Referring now to FIG. 1, a block diagram illustrating an exemplary processor 200 incorporating the teachings of the present invention is shown. The exemplary processor 200 comprises an execution unit 201, a bus controller 202, a data cache controller 203, a data cache 204, an address generation unit 207, and an instruction fetch and issue unit 205 with an integrated instruction cache 206. The elements 201–206 are coupled to each other as illustrated. Together they cooperate to fetch, issue, execute, and save execution results of Instructions in a pipelined manner. The elements 201–207 are coupled to each other as illustrated. Together they cooperate to fetch, issue, execute, and save execution results of instructions in a pipelined manner.

The instruction fetch and issue unit 205 fetches instructions from an external memory 209 through the bus controller 202 via an external system bus comprising an address bus 210a, a data bus 210b and a control signal bus 210c. The bus controller 202 manages transfers of data between external components and processor 200. In addition, it also manages cache coherency transfers. The instruction fetch and issue unit 205 then issues these instructions to the execution unit 201 in an in-order sequence. Basically, the execution unit 201 performs such functions as add, subtract, logical operations, multiply and division. Some of these instructions may be fetched and issued speculatively. Data cache controller 203 controls the access of data to/from the data cache 204. Data cache 204 is a fast, small, hardware-maintained scratchpad memory which can be reached in fewer clock cycles than main memory by loads and stores.

The instruction fetch and execution unit 205 Is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance.

In the currently preferred embodiment, the address generating unit is responsible for performing address calculations handling all segment operations and controlling accesses to all registers as concerned. The address generating unit contains one or more address calculation blocks for calculating linear addresses, as well as performing protection checks if necessary. In generating an address, the address generating unit receives data in the form of a Base address, Index (which is scaled before adding), and Displacement which are added together with the segment base to create the linear address.

Figure 3:
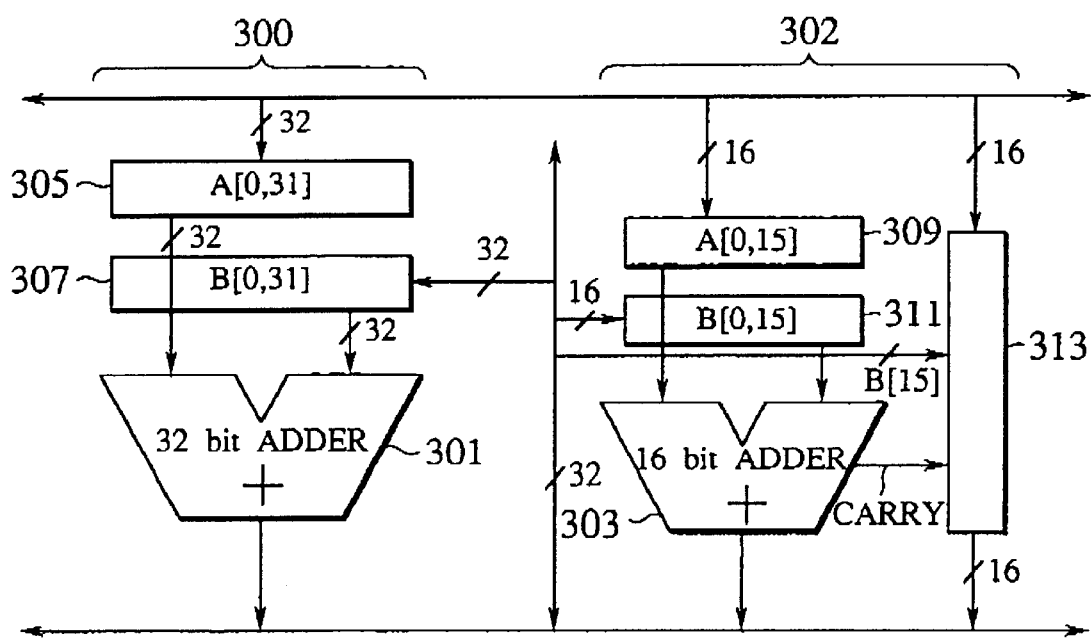
FIG. 3 is a block diagram showing the address generating unit of the processor in accordance with the embodiment of the present invention.

FIG. 3 is a block diagram showing the address generating unit of the processor in accordance with the embodiment of the present invention. The address generating unit is composed of an adder logic circuit 300 and an adder logic circuit 302. The adder logic circuit 300 serves to perform an addition operation of the first operand having a 32 bit length and the second operand having a 32 bit length. For example, the adder logic circuit 300 is used to perform an addition operation of a base address having a 32 bit length and a displacement having a 32 bit length. On the other hand, the adder logic circuit 302 serves to perform an addition operation of the first operand having a 32 bit length and the second operand having a 16 bit length. For example, the adder logic circuit 302 is used to perform an addition operation of a base address having a 32 bit length and a displacement having a 16 bit length.

Accordingly, either the adder logic circuit 300 or the adder logic circuit 302 is used in accordance with the current addressing mode. In this case, there Is no need for a sign-extension circuit.

The adder logic circuit 300 is composed of an adder element 301 having a 32 bit length, and a pair of latch circuits 305 and 307 respectively having a 32 bit length in the conventional design of a usual adder logic circuit having a 32 bit length. On the other hand, the adder logic circuit 302 is composed of an adder element 303 having a 16 bit length, a pair of latch circuits 309 and 311 respectively having a 16 bit length and, in addition to this, a higher bit handling logic circuit 313.

In the case that the first operand having a 32 bit length and the second operand having a 16 bit length. the latch circuit 309 having a 16 bit length is used to receive the bit sequence of lower 16 bits of the 32 bit operand. On the other hand, the latch circuit 311 having a 16 bit length is used to receive the 16 bit operand. The adder element 303 serves to perform an addition operation of the two 16 bit operands In a conventional manner.

The higher bit handling logic circuit 313 is used to receive the bit sequence of higher 16 bits of the 32 bit operand together with the most significant bit of the 16 bit operand in order to select one of the value of the bit sequence of higher 16 bits of the 32 bit operand as incremented, the value of the bit sequence of higher 16 bits of the 32 bit operand as decremented and the value of the bit sequence of higher 16 bits of the 32 bit operand as it is, in accordance with the value of the carry out from the most significant bit of the adder element 303 and the value of the most significant bit of the 16 bit operand.

Figure 4:
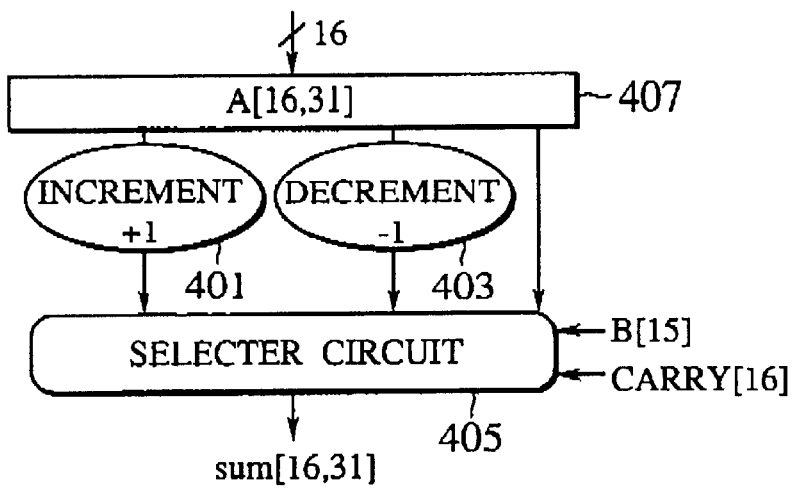
FIG. 4 is a circuit diagram of the higher bit handling logic circuit in accordance with the embodiment of the present invention.

FIG. 4 is a circuit diagram of the higher bit handling logic circuit 313. Namely, the higher bit handling logic circuit 313 is composed of a latch circuit 407 for latching the higher 16 bits of the 32 bit operand, an incrementer 401 serving to increment the value consisting of the bit sequence of the higher 16 bits of the 32 bit operand, a decrementer 403 serving to decrement the value consisting of the bit sequence of the higher 16 bits of the 32 bit operand and a selector logic circuit 405 which serves to select and output one of the output of the incrementer 401. the output of the decrementer 403 and the bit sequence of higher 16 bits of the 32 bit operand in accordance with the value of the carry out from the most significant bit of the adder element 303 and the value of the most significant bit of the 16 bit operand.

Figure 5:
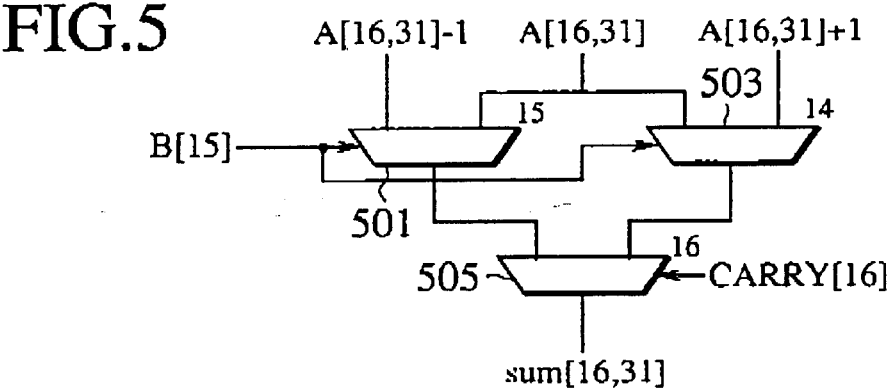
FIG. 5 is a circuit diagram of the selector logic circuit of the higher bit handling logic circuit in accordance with the embodiment of the present invention.

FIG. 5 is a circuit diagram of the selector logic circuit 405. Namely, the selector logic circuit 405 is composed of a selector element 501 serving to select the bit sequence of higher 16 bits of the 32 bit operand and the output of the incrementer 401 in accordance with the most significant bit of the 16 bit operand, a selector element 503 serving to select the bit sequence of higher 16 bits of the 32 bit operand and the output of the decrementer 403 in accordance with the most significant bit of the 16 bit operand. and the selector element 505 serving to select the output of the selector element 501 and the output of the selector element 503 in accordance with the carry out from the most significant bit of the adder element 303.

Namely, when the most significant bit of the 16 bit operand is "0", the selector element 501 outputs the bit sequence of the higher 16 bits of the 32 bit operand while the selector element 503 outputs the output of the incrementer 401. On the other hand, when the most significant bit of the 16 bit operand is "1", the selector element 503 outputs the bit sequence of tho higher 16 bits of the 32 bit operand while the selector element 503 outputs the output of the decrementer 403.

Also, when the carry out from the most significant bit as output from the adder element 303 is "0", the selector element 505 outputs the output of the selector element 501. On the other hand, when the carry out from the most significant bit as output from the adder element 303 is "1", the selector element 505 outputs the output of the selector element 503.

Figure 6:
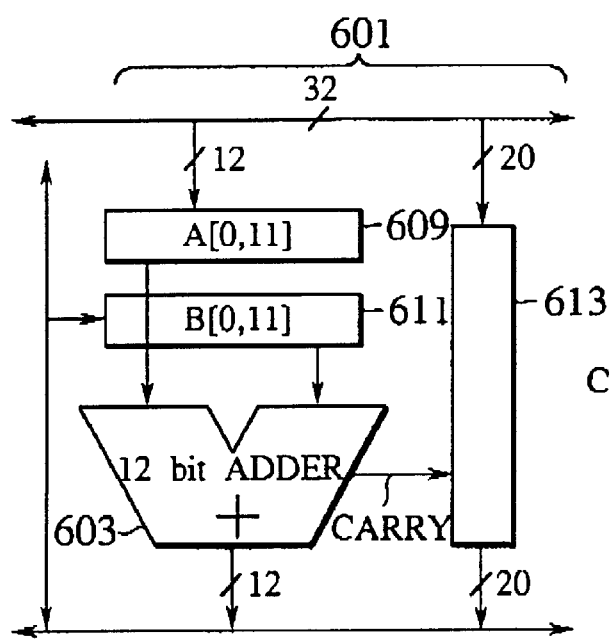
FIG. 6 is a block diagram showing an adder logic circuit in accordance with another embodiment of the present invention.
Figure 7:
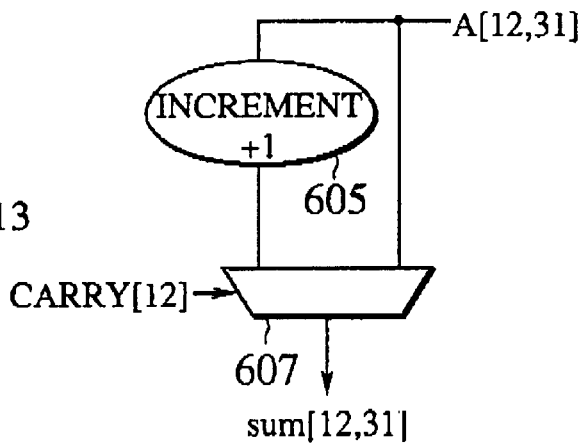
FIG. 7 is a circuit diagram of the higher bit handling logic circuit in accordance with the other embodiment of the present invention.

FIG. 6 is a block diagram showing an adder logic circuit in accordance with another embodiment of the present invention. This is one of the adder logic circuits as used in the paging unit serving to translate addresses as calculated by the address generating unit, i.e., the linear addresses into the corresponding physical addresses. In this case, a page offset is added to the top address of the page and therefore there is no need to consider a negative value. Accordingly, for example, the translation from an operand having a 16 bit length to an operand having a 32 bit length is performed always as "zero-extension", i.e., zeros are always used to fill the bit positions to the left of the 16 bit operand, rather than sign-extension.

The adder logic circuit 601 serves to perform the addition operation of the numerical value having a 32 bit length and the numerical value having a 12 bit length. For example, the adder logic circuit 601 is used to obtain a physical address by the top address of a page having a 32 bit length and a page offset having a 12 bit length.

The adder element 603 is composed of a pair of latch circuits 609 and 311 respectively having a 16 bit length and, In addition to this, connected to a higher bit handling logic circuit 613. The higher bit handling logic circuit 613 is composed of an incrementer 605 serving to increment the value consisting of the bit sequence of the higher 20 bits of the 32 bit operand and a selector element 607. The selector element 607 is connected to the incrementer 605 and the adder element 603. When the carry out from the most significant bit as output from the adder element 603 is "1", the selector element 607 outputs the bit sequence of the higher 20 bits of the 32 bit top address of the page. On the other hand, hen the carry out from the most significant 15 bit as output from the adder element 603 is "1", the selector element 607 outputs the output of the incrementer 605.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

For example, in the above description, a typical higher bit handling logic circuit is illustrated in the above embodiment of the present invention. However, there is several modifications of such a higher bit handling logic circuit. While the processing speed of the adder element has currently been increasing, the higher bit handling logic circuit can be optimized in order to keep pace with the advance.

Also, the bit width of the respective operands are only exemplary while those skilled in the art will be able to implement the present invention to a variety of applications without further teaching.

What is claimed is:

1. An adder logic circuit for performing an addition operation of a first numerical value and a second numerical value having a bit width narrower than that of said first numerical value comprising:

an adder element for performing an addition operation of said second numerical value and a third numerical value Composed of a lower bit sequence of said first numerical value, the bit width of said third numerical value being equal to the bit width of said second numerical value; and a higher bit handling logic circuit connected to said adder element for receiving a carry out from the most significant bit of said adder element together with a fourth numerical value composed of a higher bit sequence composed of the remainder of said first numerical value, the most significant bit of said the second numerical value in order to output one of said fourth numerical value, said fourth numerical value as incremented and said fourth numerical value as decremented in accordance with the carry out from the most significant hit of said adder element and the most significant bit of said second numerical value.

2. The adder logic circuit for performing an addition operation as claimed in claim 1 wherein said higher bit handling logic circuit is composed of an incrementer for incrementing said fourth numerical value, a decrementer for decrementing said fourth numerical value and a selector logic circuit for outputting one of the output of said incrementer, the output of said decrementer and said the fourth numerical value in accordance with the most significant bit of said second numerical value.

3. The adder logic circuit for performing an addition operation as claimed in claim 2 wherein said selector logic circuit is composed of a first selector element for selecting and outputting one of first and second pairs of bit sequences in accordance with the most significant bit of said second numerical value, the first pair comprising the output of said incrementer and said fourth numerical value, the second pair comprising the output of said decrementer and said fourth numerical value. and a second selector logic circuit for selecting and outputting one of the pair as selected by said first selector element in accordance with the carry out from the moot significant bit of said adder element.

4. A processor including:

an address bus connected to a memory;

a data bus connected to said memory; and an address generating unit for calculating an address of an instruction/data required for execution of a program;

said address generating unit provided with an adder logic circuit for performing an addition operation of a first numerical value and a second numerical value having a bit width narrower than that of said first numerical value, said adder logic circuit comprising:

an adder element for performing an addition operation of said second numerical value and a third numerical value composed of a lower bit sequence of said first numerical value, the bit width of said third numerical value being equal to the bit width of said second numerical value; and a higher bit handling logic circuit connected to said adder element for receiving a carry out from the most significant bit of said adder element together with a fourth numerical value composed of a higher bit sequence composed of the remainder of said first numerical value, the most significant bit of said the second numerical value In order to output one of said fourth numerical value, said fourth numerical value as incremented and said fourth numerical value as decremented in accordance with the carry out from the most significant bit of said adder element and the most significant bit of said second numerical value.

5. The adder logic circuit for performing an addition operation as claimed in claim 4 wherein said higher bit handling logic circuit is composed of an incrementer for incrementing said fourth numerical value, a decrementer for decrementing said fourth numerical value and a selector logic circuit for outputting one of the output of said incrementer, the output of said decrementer and said the fourth numerical value in accordance with the most significant bit of said second numerical value.

6. The adder logic circuit for performing an addition operation as claimed in claim 5 wherein said selector logic circuit is composed of a first selector element for selecting and outputting one of first and second pairs of bit sequences in accordance with the most significant bit of said second numerical value, the first pair comprising the output of said incrementer and said fourth numerical value, the second pair comprising the output of said decrementer and said fourth numerical value, and a second selector logic circuit for selecting and outputting one of the pair as selected by said first selector element in accordance with the carry out from the most significant bit of said adder element.

7. A processor including:

an address bus connected to a memory;

a data bus connected to said memory; and an address generating unit for calculating an address of an instruction/data required for execution of a program;

said address generating unit provided with a first adder logic circuit for performing an addition operation of two numerical values having the same bit width and a second adder logic circuit for performing an addition operation of a first numerical value and a second numerical value having a bit width narrower than that of said first numerical value, said adder logic circuit comprising:

an adder element for performing an addition operation of said second numerical value and a third numerical value composed of a lower bit sequence of said first numerical value, the bit width of said third numerical value being equal to the bit width of said second numerical value; and a higher bit handling logic circuit connected to said adder element for receiving a carry out from the most significant bit of said adder element together with a fourth numerical value composed of a higher bit sequence composed of the remainder of said first numerical value, the most significant bit of said the second numerical value in order to output one of said fourth numerical value, said fourth numerical value as incremented and said fourth numerical value as decremented in accordance with the carry out from the most significant bit of said adder element and the most significant bit of said second numerical value.

8. The adder logic circuit for performing an addition operation as claimed in claim 7 wherein said higher bit handling logic circuit is composed of an incrementer for incrementing said fourth numerical value, a decrementer for decrementing said fourth numerical value and a selector logic circuit for outputting one of the output of said incrementer, the output of said decrementer and said the fourth numerical value in accordance with the most significant bit of said second numerical value.

9. The adder logic circuit for performing an addition operation as claimed in claim a wherein said selector logic circuit is composed of a first selector element for selecting and outputting one of first and second pairs of bit sequences in accordance with the most significant bit of said second numerical value. the first pair comprising the output of said incrementer and said fourth numerical value, the second pair comprising the output of said decrementer and said fourth numerical value, and a second selector logic circuit for selecting and outputting one of the pair as selected by said first selector element in accordance with the carry out from the most significant bit of said adder element.

\* \* \* \* \*

UNITED STATES PATENT AND TRADEMARK OFFICE
CERTIFICATE OF CORRECTION

PATENT NO.    : 6,505,225 B1
DATED         : January 7, 2003
INVENTOR(S)   : Takayanagi It is certified that error appears in the above-identified patent and that said Letters Patent is hereby corrected as shown below:

Column 8,
Line 5, change "Composed" to -- composed --; and
Line 19, change "hit" to -- bit --.
Line 38, change "value." to -- value, --; and
Line 41, change "moot" to -- most --.
Line 65, change "In" to -- in --.

Column 10,
Line 28, change "claim a" to -- claim 8 --; and
Line 32, change "value." to -- value, --.

Signed and Sealed this

Twenty-seventh Day of May, 2003

JAMES E. ROGAN
*Director of the United States Patent and Trademark Office*